United States Patent [19]

Ohnishi et al.

[11] Patent Number: 4,794,069
[45] Date of Patent: Dec. 27, 1988

[54] SPIROBENZANTHRACENE PHTHALIDE COMPOUNDS, PROCESSES FOR PREPARING SAME AND COLOR FORMING RECORDING MATERIALS CONTAINING SAID COMPOUNDS

[75] Inventors: Yutaka Ohnishi, Urawa; Shinji Yoshinaka, Iwatsuki; Toshiyuki Tanaka, Inagi; Minoru Koguchi, Ageo; Takeo Obitsu, Omiya, all of Japan

[73] Assignee: Shin Nisso Kako Co., Ltd., Japan

[21] Appl. No.: 72,911

[22] Filed: Jul. 14, 1987

[30] Foreign Application Priority Data

Jul. 15, 1986 [JP] Japan .................. 61-164591

[51] Int. Cl.⁴ .................. G03C 1/733; G03C 5/16; C07D 307/94
[52] U.S. Cl. .................. 430/338; 430/346; 430/351; 430/964; 503/218; 503/217; 503/219; 549/265; 544/70; 548/407; 546/15
[58] Field of Search .................. 549/265; 544/70; 548/407; 546/15; 260/350 L; 503/218, 222; 430/338, 351, 964, 346

[56] References Cited

U.S. PATENT DOCUMENTS

| | | | |
|---|---|---|---|
| 3,377,167 | 4/1968 | Fichter | 430/338 |
| 3,997,541 | 12/1976 | Schefczik et al. | 546/15 |
| 4,024,157 | 5/1977 | Hotta et al. | 548/407 |

Primary Examiner—Paul R. Michl
Assistant Examiner—Mark R. Buscher
Attorney, Agent, or Firm—Michael N. Meller

[57] ABSTRACT

Spirobenzanthracene phthalide compounds are disclosed of the formula (I)

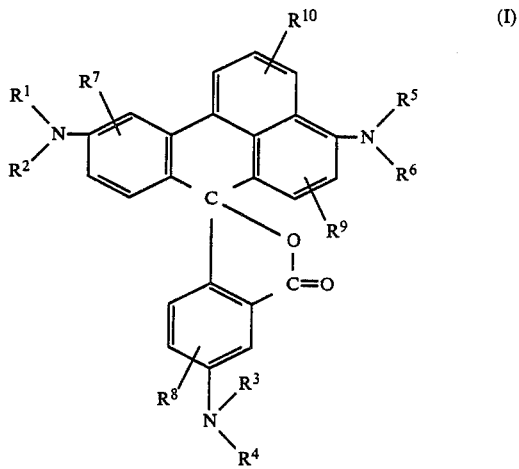

wherein $R^1$, $R^2$, $R^3$, $R^4$, $R^5$ and $R^6$ independently represent $C_1$–$C_8$ alkyl optionally substituted by $C_1$–$C_5$ alkoxy; $C_5$ or $C_6$ cycloalkyl; or aralkyl or aryl optionally substituted by $C_1$–$C_5$ alkyl or $C_1$–$C_5$ alkoxy, and $R^1$ and $R^2$, $R^3$ and $R^4$, and $R^5$ and $R^6$ taken together with the nitrogen atom to which they are attached, may form pyrrolidino, piperidino or morpholino ring, and $R^7$, $R^8$, $R^9$ and $R^{10}$ independently represent hydrogen, $C_1$–$C_5$ alkyl, $C_1$–$C_5$ alkoxy or trifluoromethyl. The compounds are used, together with a developer, in color for materials such as pressure-sensitive copying papers, heat-sensitive recording papers and the like.

19 Claims, 5 Drawing Sheets

SPIROBENZANTHRACENE PHTHALIDE COMPOUNDS, PROCESSES FOR PREPARING SAME AND COLOR FORMING RECORDING MATERIALS CONTAINING SAID COMPOUNDS

FIELD OF THE INVENTION

This invention relates to new spirobenzanthracene phthalide compounds, processes for preparing same and color forming recording materials containing said compounds. More particularly, the invention pertains to chromogenic dyes which are colorless or substantially colorless in themselves but form colors by the action of developers, the formed colors absorbing electromagnetic waves ranging from the long-wavelength region of visible light to nearinfrared ray regions.

BACKGROUND OF THE INVENTION

Chromogenic dees which are colorless or substantially colorless but form colors by the action of developers have heretofore been extensively used in various color forming recording materials such as pressure-sensitive copying papers, heat-sensitive recording papers and the like.

With the progress of recent development of electronics, the application of the chromogenic dyes has been increasingly enlarged in the field of information on the premises or the distribution of commodities, for example, P.O.P. (Point-of-Purchase) or P.O.S. (Point-of-Sale), where bar codes are prepared at the stage of users and the users read them by utilizing electromagnetic waves emitted from semiconductor lasers.

Under such circumstances, there is a pressing need for chromogenic dyes which absorb not only electromagnetic waves in the visible light regions but also electromagnetic waves in the near-infrared ray regions emitted from the semiconductor lasers at the time of forming colors.

There have been proposed the chromogenic dyes including, for example, phthalide type compounds as disclosed in Japanese Patent LOP Publn. Nos. 121035/1976, 121037/1976, 121038/1976, 115448/1980, 115449/1980, 115450/1980, 115451/1980, 115452/1980, 115456/1980, 167979/1982, 157779/1983, 8364/1985 and 27589/1985, thiofluoran type compounds as disclosed in Japanese Patent LOP Publn. No. 148695/1984, fluorene type compounds as disclosed in Japanese Patent LOP Publn. Nos.1199757/1984 and 226871/1985, and leucocyanine type compounds as disclosed in Japanese Patent LOP Publn. No. 230890/1985.

These compounds mentioned above, however, were not found to be sufficiently satisfactory with respect to light fastness of colors formed by the action of the developers and to percent absorption of electromagnetic waves in the near-infrared regions.

SUMMARY OF THE INVENTION

A principal object of this invention is to provide chromogenic dyes which form colors by the action of developers, the colors formed thereby having not only absorption in the near-infrared ray regions of electromagnetic waves but also very large percentage of absorption and excellent fastness to light.

Another object of the invention is to provide color forming recording materials using the above-mentioned dyes, for example, pressure-sensitive copying papers, heatsensitive recording papers and the like.

Other objects of the invention wil be obvious from the contents of the specification hereinafter disclosed.

DETAILED DESCRIPTION OF THE INVENTION

Figure 1:
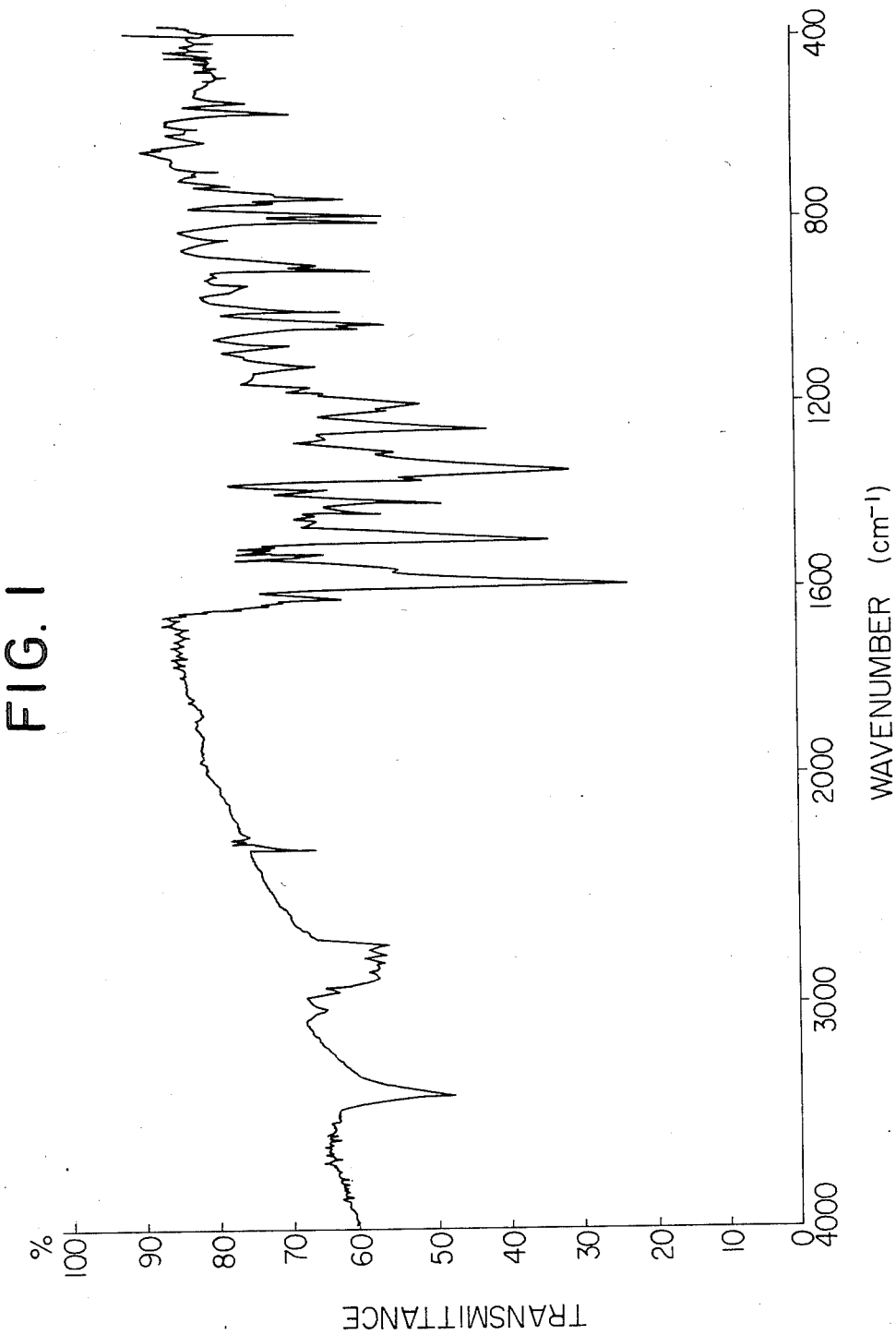
FIG. 1 is an infrared absorption spectrum of 6,4',10'-tris(dimethylamino)-spiro[7H-benz[de]anthracene3,7'-phthalide]as prepared in Example 1.

The objects of this invention are accomplished by providing as chromogenic dyes new spirobenzanthracene phthalide compounds of the formula (I)

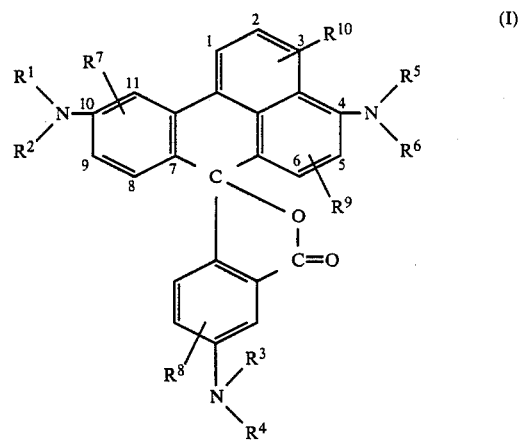

wherein $R^1$, $R^2$, $R^3$, $R^4$, $R^5$ and $R^6$ independently represent $C_1$-$C_8$ alkyl optionally substituted by $C_1$-$C_5$ alkoxy; $C_5$ or $C_6$ cycloalkyl; or aralkyl or aryl optionally substitute by $C_1$-$C_5$ alkyl or $C_1$-$C_5$ alkoxy, and $R^1$ and $R^2$, $R^3$ and $R^4$, and $R^5$ and $R^6$ taken together with the nitrogen atom to which they are attached, may form pyrrolidino, piperidino or morpholino ring, and $R^7$, $R^8$, $R^9$ and $R^{10}$ independently represent hydrogen, $C_1$-$C_5$ alkyl, $C_1$-$C_5$ alkoxy or trifluoromethyl.

Listed below are, by way of illustration but not of limitation, representative examples of the spirobenzanthracene phthalide compounds of the formula (I).

| Compound | $-N\begin{smallmatrix}R^1\\R^2\end{smallmatrix}$ | $-N\begin{smallmatrix}R^3\\R^4\end{smallmatrix}$ | $-N\begin{smallmatrix}R^5\\R^6\end{smallmatrix}$ | Remarks |
|---|---|---|---|---|
| 1 | $-N(CH_3)_2$ | $-N(CH_3)_2$ | $-N(CH_3)_2$ | |
| 2 | $-N(C_2H_5)_2$ | $-N(C_2H_5)_2$ | $-N(C_2H_5)_2$ | |
| 3 | $-N(CH_3)_2$ | $-N(CH_3)_2$ | $-N(CH_3)_2$ | Having $CH_3$ at the 8-position |
| 4 | $-N(CH_3)_2$ | $-N(CH_3)_2$ | $-N(CH_3)_2$ | Having $CF_3$ at the 8-position |
| 5 | $-N(CH_3)(CH_2CH_2OCH_3)$ | $-N(CH_3)_2$ | $-N(CH_3)(C_6H_{11})$ | |
| 6 | $-N(CH_3)(n\text{-}C_8H_{17})$ | $-N(CH_3)_2$ | $-N(CH_3)(C_6H_5)$ | |
| 7 | $-N(CH_3)(C_6H_{11})$ | $-N(CH_3)_2$ | $-N(CH_3)(p\text{-}CH_3C_6H_4)$ | |
| 8 | $-N(CH_2C_6H_5)_2$ | $-N(CH_3)(C_6H_5)$ | $-N(CH_3)_2$ | |
| 9 | $-N(CH_3)(p\text{-}CH_3C_6H_4)$ | $-N(CH_2)_4$ (pyrrolidinyl) | $-N(CH_3)_2$ | |
| 10 | $-N(CH_2)_4$ (pyrrolidinyl) | $-N(CH_3)_2$ | $-N(n\text{-}C_3H_7)_2$ | |

| Compound | $-N\begin{smallmatrix}R^1\\R^2\end{smallmatrix}$ | $-N\begin{smallmatrix}R^3\\R^4\end{smallmatrix}$ | $-N\begin{smallmatrix}R^5\\R^6\end{smallmatrix}$ | Remarks |
|---|---|---|---|---|
| 11 | —N⟨ ⟩O (morpholino) | —N(CH₂Ph)(CH₂Ph) | —N(CH₃)(CH₃) | ($R^7, R^8, R^9$ and $R^{10}$ = H) |

The compounds of the formula (I) can be prepared by subjecting phthalide compound of the formula

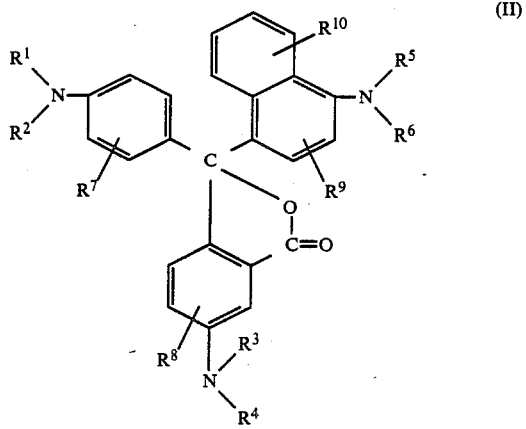

(II)

wherein $R^1, R^2, R^3, R^4, R^5, R^6, R^7, R^8, R^9$ and $R^{10}$ are as defined above, to dehydrogenation ring closure by the action of Friedel-Crafts type catalysts. In the formulas (I) and (II), $C_1$-$C_8$ alkyl, $C_1$-$C_5$ alkyl and $C_1$-$C_5$ alkoxy may be of straight or branched chain.

The amount of Friedel-Crafts type catalysts used must be at least one mole per one mole of the phthalide cmmpounds of the formula (II). Examples of Friedel-Crafts type catalysts include, for example, anhydrous aluminum chloride, anhydrous antimony chloride, anhydrous ferric chloride, anhydrous tellurium chloride, anhydrous stannic chloride, anhydrous titanium chloride, anhydrous bismuth chloride, anhydrous zinc chloride, boron fluoride, phosphorus trichloride, phosphorus pentachloride, phosphorus oxychloride, phosphorus pentoxide, phosphoric acid, polyphosphoric acid, hydrochloric acid, sulfuric acid, acetic acid, trifluoroacetic acid or aluminum chloride-sodium chloride complex salts. These catalysts are used either singly or in combination of two or more.

Although the reaction may be carried out by simply mixing and fusing together the phthalide compounds of the formula(II) and Friedel-Crafts type catalysts, it is advantageous to effect the reaction in organic solvents in order to facilitate control of the progress of the reaction. Suitable organic solvents are those which are conventionally used in Friedel-Crafts' reaction, for example, trichloroethane, tetrachloroethane, tetrachloroethylene, nitrobenzene, dichlorobenzene, trichlorobenzene and the like.

The reaction temperature ranges from 100° to 200° C., suitably from 120° to 150° C. and in most cases the reaction is complete in about 1 hour.

The phthalide compounds of the formula (II) may be prepared, for example, in accordance with the methods as disclosed in Japanese Patent LOP Publn. No. 5746/1977.

The spirobenzanthracene phthalide compounds of the formula (I) form colors by the action of developers and possess such noticiable properties that the colors formed have not only their absorption in the near infrared ray regions of electromagnetic waves but also have exceedingly high percentage of absorption as compared with that of colors formed by known phthalide, thiofluoran or fluorene type compounds as mentioned above, and excellent fastness to light.

According to another aspect of the present invention, there is provided a color forming recording material comprising the compound of the formula (I) and a developer which reacts with said compound to form colors. The term "color forming recording material" as used in the invention is intended to mean various end use forms of color forming recording materials prepared by applying the compounds of the general formula (I) and developers which develop said compounds to form colors nnto suitable supports, for example, papers, plastics and the like. Examples of such color forming recording materials include pressure-sensitive copying papers, heat-sensitive recording papers, photosensitive recording papers, electron rays recording papers, electro thermo-recording papers, discharge recording papers and the like.

Developers for color developing the compounds of the formula (I) include (a) inorganic or organic acidic substances, (b) organohalogen compounds which form halogen radicals under the influence of light or heat, and (c) quinoid type electron accepting substances.

What is worthy for noticing in this conneciion is the fact that the colors of the compounds of the formula (I) developed by the above-mentioned developers (b) or (c) absorb electromagnetic waves in the wavelength region of greater than 700 nm stronger than those of said compounds developed by conventional acidic substances.

Suitable examples of the acidic substances include, for example, inorganic acidic substances such as acid clay, activated clay, attapulgite, bentonite, colloidal silica and aluminum silicate; aromatic carboxylic acids such as benzoic acid, p-tert-butylbenzoic acid, nitrobenzoic acid, cyanobenzoic acid, phthalic acid, gallic acid, salicyclic acid, 3-isopropylsalicyclic acid, 3-phenylsalicyclic acid, 3-cyclohexylsalicyclic acid, 3,5-di-tertbutylsalicyclic acid, 3-methyl-5-benzylsalicyclic acid, 3-phenyl-5-(α,α-dimethylbenzyl)salicyclic acid, 3,5-di-(2-methylbenzyl)salicyclic acid and 2-hydroxy-1-benzyl-3-naphthoic acid; salts of these aromatic carboxylic acids with such metals as zinc, tin, magnesium, aluminum and titanium; phenol resin type developers such as p-phenylphenol-formalin resins and p-butylphenolacetylene resins; mixtures of these phenol resin type developers and the above-mentioned metal salts of aromatic carboxylic acids; and phenolic acidic substances which include the following: bisphenol compounds such as bisphenol A, 4,4'-sec-butylidenebisphenol, 4,4'-cyclohexylidenebisphenol, 2,2'-dihydroxydiphenyl, pentamethylene-bis(4-hyroxybenzoate) and 1,7-bis(4-hydroxyphenylthio)-3,5-dioxaheptane; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, chlorobenzyl 4-hydroxybenzoate, methylbenzyl 4-hydroxybenzoate and diphenylmethyl 4-hydroxybenzoate; hydroxydiphenyl sulfones such as 4-hydroxy-4'-methyldiphenyl sulfone, 4-hydroxy-4'-isopropoxydiphenyl sulfone and 4-hydroxy-4'-butoxydiphenyl sulfone; 4-hydroxyphthalic acid diesters such as dimethyl 4-hydroxyphthalate, dicyclohexyl 4-hydroxyphthalate and diphenyl 4-hydroxyphthalate; such esters of hydroxynaphthoic acid as 2-hydroxy-6-carboxynaphthalene; and lauryl esters of gallic acid, 2,2-bis(4-carboxyphenyl)hexafluoropropane, zinc thiobenzoate, hydroxyacetophenone, p-phenylphenol, benzyl 4-hydroxyphenylacetate, p-benzylphenol, hydroquinone-monobenzyl ether or the like.

Color development by the action of these acidic substances on the spirobenzanthracene phthalide compounds of the formula (I) is applied to such fields of art as pressure-sensitive copying and heat-sensitive recording techniques and it is also utilized in such technical fields, for example, as heat-sensitive transfer, electro thermorecording, electrophotography, photosensitive recording ultrasonic recording and electrostatic recording.

Commonly known as the organohalogen compounds which form halogen radicals by the action of light or heat are carbon tetrabromide, bromoform, bromochloroform, hexabromoethane, hexachlorobenzene, hexabromobenzene, tribromoacetic acid esters, hexabromodimethyl sulfone, 2,4,6-tris(trichloromethyl)triazine and the like, and these compounds can be conveniently used in the present invention. However, the organohalogen compounds which are used more preferably in the present invention are those of the following formulas, (III) and (IV):

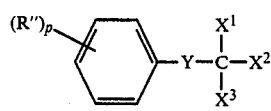

wherein R'' represents halogen, nitro, cyano or lower alkyl, p represents 0 or an integer of 1 to 5, R'' may be different substituents when p is 2 or more, Y represents

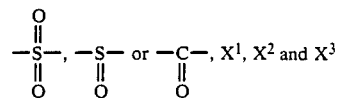

independently represent hydrogen, chlorine or bromine, provided that all of $X^1$, $X^2$ and $X^3$ are not hydrogen atoms.

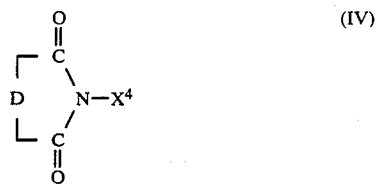

wherein D represents

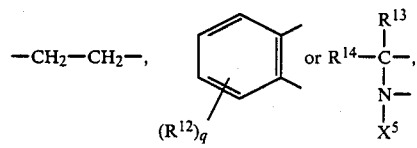

$R^{12}$ represents halogen, nitro or lower alkyl, q is 0 or an integer of 1 to 4, $R^{12}$ may be different substituents when q is 2 or more, $R^{13}$ and $R^{14}$ may be the same or different and represent hydrogen or lower alkyl, and $X^4$ and $X^5$ may be the same or different and represent chlorine or bromine.

The organohalogen compounds of the formula (III) and/or (IV) are disclosed as developers for photosensitive recording materials in Japanese Patent Publication No 1895/1972, Japanese Patent LOP Publn. Nos. 137126/1975, 212434/1982 and 132229/1983, and as developers for heat-sensitive recording materials in Japanese Patent LOP Publn. No. 3791/1986. Typical examples of the organohalogen compounds include, by way of illustration but not of limitation, for example, tribromomethylphenyl sulfone, trichloromethylphenyl sulfone, tribromomethyl-p-chlorophenyl sulfone, trichloromethyl-p-chlorophenylsulfone, tribromomethyl-p-nitrophenyl sulfone, tribromomethyl-o-methylphenyl sulfone, tribromomethyl-o-isopropylphenyl sulfone, α,α,α-tribromoacetophenone, α,α,α-trichloroacetophenone, p-nitro-α,α,α-tribromoacetophenone, p-chloro-α,α,α-tribromoacetophenone, tribromomethylphenyl sulfoxide, trichloromethylphenyl sulfoxide, N-bromophthalimide, N-bromo-2-chlorophthalimide, N-bromo-1,2,3,4-tetrachlorophthalimide, 1,3-dichloro-5,5-dimethylhydantoin, 1,3-dibromo-5,5-dimethylhydantoin, N-bromosuccinic imide and N-chlorosuccinic imide.

It is not elucidated at present by what mechanism the organohalogen compounds used in the present invention, particularly the compounds of the formulas (III) and (IV), exhibit color developing action. However, it is considered that the application of heat or irradiation with light of high energy (e.g. ultraviolet rays, hereinafter called "light") will generate a halogen radical, and parts of the formed halogen radicals react with hydrogen donors (e.g. binders, water, etc.) to form acidic substances whereby the compounds of the formula (I) develop colors by synergistic effect of the halogen radicals and acidic substances as formed. Accordingly, the proportions of the organohalogen compounds to the compounds of the formula (I) should be decided taking into account the amount of halogen radicals formed by the application of heat or irradiation with light as aforesaid.

Quinoid type electron accepting substances which react with the compounds of the formula (I) to form colors are quinoid compounds containing in the molecular structure a backbone represented by the formula

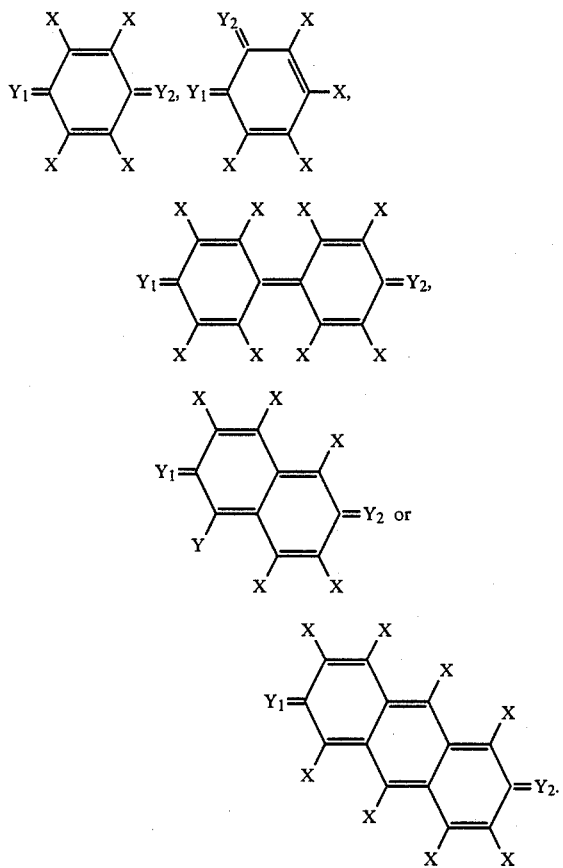

In the above-mentioned formulas, $Y_1$ and $Y_2$ may be the same or different and each represents oxygen or

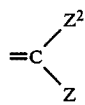

wherein Z represents cyano or $C_1$–$C_5$ alkoxysubstituted carbonyl.

The quinoid type electron accepting compounds can be classified into three forms, according to the combination of $Y_1$ and $Y_2$ of the above-mentioned formulas, that is, the quinone form in which both $Y_1$ and $Y_2$ are oxygen atoms, the quinomethane form in which one of $Y_1$ and $Y_2$ are

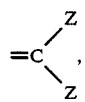

oxygen atom, and the other is

The X's groups in the above-mentioned formulas may be the same or different and each represents hydrogen atom, alkyl, alkoxy, aryloxy or electron attracting groups such as chlorine, bromine, nitro, cyano, arylcarbonyl, alkylcarbonyl, aryloxycarbonyl, alkyloxycarbonyl, srylsulfonyl, alkylsulfonyl, arylsulfinyl and alkylsulfinyl, and further adjacent X groups taken together may form an aryl ring. The aryl ring may be substituted by the same groups as defined for X.

Where the quinoid type electron accepting compound used is of the quinone form, at least one of the X's groups should be such an electron attracting group as mentioned above.

Concrete examples of the above-mentioned quinoid type electron accepting compounds include, by way of illustration but not of limitation, for example, 2,5-dichloro-1,4-benzoquinone, 2,6-dichloro-1,4-benzoquinone, 2,3,5,6-tetrachloro-1,4-benzoquinone (commonly known as "chloranil"), 2,3,5,6-tetracyano-1,4-benzoquinone, 2,3-dichloro-5,6-dicyano-1,4-benzoquinone, 3,4,5,6-tetracyano-1,2-benzoquinone, 2,3-dichloro-1,4-naphthoquinone, 3,6-dibromo-2,5-diethoxycarbonyl-1,4-benzoquinone, 3,6-diphenyl-sulfonyl-2,5-diethoxycarbonyl-1,4-benzoquinone, 7,7,8,8-tetracyano-1,4-quinodimethane 3,6-bis(dicyanomethylene)-1,4-cyclohexadiene (commonly known as "tetracyanoquinodimethane")], 7,7,8,8-tetrakis(methoxycarbonyl)-1,4-quinodimethane, 9,9,10,10-tetracyano-1,4-naphthoquinodimethane, 9,9,10,10-tetracyano-2,6-naphthoquinodimethane, 11,11,12,12-tetracyano-9,10-anthraquinodimethane, 11,11,12,12-tetracyano-2,6-anthraquinodimethane, 10-(dicyanomethylene)anthrone, 10-bis(ethoxycarbonyl)methyleneanthrone and 11,11-dicyano-12,12-bis(ethoxycarbonyl)-9,10-anthraquinodimethane.

The spirobenzanthracene phthalide compounds of the formula (I) and the above-mentioned quinoid type electron accepting substances are suitably used in a weight ratio of from about 1:0.5 to about 1:5.

Color development of the compounds of the formula (I) by the action of the organohalogen compounds which generate halogen radicals under influence of light or heat or by the action of the quinoid type electron accepting substances is utilized, for example, in heatsensitive recording, photosensitive recording, electron rays recording, electro thermo-recording and discharge recording techniques.

Pressure-sensitive copying papers using the compounds of the formula (I) can be prepared in accordance with such procedures as disclosed in U.S. Pat. Nos. 2,548,365, 2,548,366, 2,800,457 and 2,800,458, Japanese Patent LOP Publn. No. 112041/1983 or 139738/1983.

The pressure-sensitive copying paper may be a unit comprising a top sheet wherein microcapsules encapsulating a solution of the chromogenic dye in an organic solvent are coated onto the lower surface, and a bottom sheet wherein an acidic substance is coated onto the upper surface (optionally the unit may be provided with a middle sheet carrying the acidic substance on the upper surface and microcapsules on the lower surface), or a self-contained paper wherein microcapsules and the acidic substance are coated onto the same surface of the paper.

The organic solvents used include, for example, diphenylmethane, alkyl naphthalene or alkyl triphenyl type, which can dissolve well the compounds of the formula (I) and which are inactive and nonvolatile.

In the same manner as in the case of known chromogenic dyes, heat-sensitive recording papers using the compounds of the formula (I) can be prepared in accordance with such procedures as disclosed, for example, in Japanese Patent Publns. Nos. 27579/1964, 4160/1968 and 14039/1970, or Japanese Patent LOP Publn. No. 7087/1984.

More particularly, heat-sensitive recording papers having excellent color forming properties can be prepared by coating onto the surface of paper, a suspension in which fine particles of the present compound of the formula (I) or mixtures thereof with other chromogenic dyes and fine particles of developers are dispersed in an aqueous solution of a water-soluble binder, followed by drying. Furthermore, there can be prepared heat-sensitive recording papers having very high sensitivity when sensitizers are added to the suspension. This suspension may further contain fillers, dispersing agents, colored image stabilizers, antioxidants, desensitizers, anti-tack agents, defoaming agents, light stabilizers, optical brighteners or the like.

The water-soluble binders used in the present invention include, by way of illustration but not of limitation, for example, polyvinyl alcohol, hydroxyethyl cellulose, carboxymethyl cellulose, salts of styrenemaleic anhydride copolymers, styrene-butadiene emulsions, vinyl acetate-maleic anhydride emulsions polyacrylates, polyacrylamide, starches, casein and gum arabic.

The sensitizers used include, for example, higher fatty acid amides, benzamide, stearic acid anilide, acetoacetic acid anilide, thioacetoanilide, dimethyl phthalate, dibenzyl terephthalate, dibenzyl isophthalate, diethers of bisphenol S such as 4,4'-dimethoxydiphenyl sulfone, 4-iso-propoxy4'-n-butoxy sulfone, 4,4'-dibutoxydiphenyl sulfone, 4,4'-di-n-(or iso-)penthyloxydiphenyl sulfone and the like, diphenylamine, carbazole, 2,3-di-m-tolylbutane, 4,4'-dimethylbiphenyl and di-$\beta$-naphthylphenylenediamine.

The fillers used include, for example, clay, talc, kaolin, satin white, titanium oxide, calcium carbonate, magnesium carbonate, barium sulfate, magnesium silicate, aluminum silicate and the like. Further, the dispersing agents include, for example, sulfosuccinic acid esters such as sodium dioctyl sulfosuccinate, sodium dodecylbenzenesulfonate, sodium lauryl sulfate and salts of fatty acid. The colored image stabizers include, for example, metal salts (particularly zinc salt) of benzoic acid derivatives (particularly, p-nitrobenzoic acid and p-cyanobenzoic acid), salicyclic acid derivatives or oxynaphthonic acid derivatives and other water-soluble zinc compounds. The antioxidants include, for example, 2,2'-methylenebis(4-methyl-6-tert-butylphenol), 2,2'-methylenebis(4-ethyl-6-tert-butylphenol), 4,4'-propylmethylenebis(3-methyl-6-tert-butylphenol), 4,4'-thiobis(2-tert-butyl-5-methylphenol) and 2-(2'-hydroxy-5'-methylphenyl)benzotriazole. The desensitizers include, for example, aliphatic higher alcohols, polyethylene glycol and guanidine derivatives. The anti-tack agents include, for example, stearic acid, zinc stearate, calcium stearate, carnauba wax and paraffin wax.

The compounds of the formula (I) can be used for heat transfer in accordance with such procedures as disclosed, for example, in Japansse Patent LOP Publn. No. 212985/1983, 33185/1984, 42995/1984 or 225986/1984, for electro thermo-recording in accordance with such procedures as disclosed, for example, in Japanese Patent LOP Publn. No. 96137/1973, 101935/1973 or 11344,/1974, and for electrophotography in accordance with such procedures as disclosed, for example, in Japanese Patent LOP Publn. No. 24530/1977 or 56932/1977. Furthermore, the compounds of the present invention can be used for photosensitive recording in accordance with such procedures as disclosed, for example, in Japanese Patent Publn. No. 24188/1963, 0550/1970 or 45978/1974, and Japanese Patent LOP Publn. No. 80120/1975, 126228/1975, 141633/1977 or 147829/1979. In that case, there are used acid precursors which form protonic acid or Lewis acid by the action of energy rays. Such acid precursors include, for example, diazonium salts, iodonium salts and sulfonium salts such as dimethylphenacylsulfonium hexafluorophosphate or triphenylsulfonium hexafluoroantimonate (V).

The compounds of the formula (I) can also be used for ultrasonic wave recording in accordance with a procedure as disclosed in French Patent No. 2,120,922, for electrostatic recording in acoordance with a procedure as disclosed in Japanese Patent Publn. No. 3932/1974, and in photosensitive printing materials in accordance with a procedure as disclosed in Japanese Patent LOP Publn. No. 12104/1973.

Recording papers prepared in accordance with these procedures can be provided, if necessary, on the surface thereof with a protective layer, and also can be provided on the back surface thereof with a stickly layer for the convenience of using them as lables.

The recording materials prepared in accordance with the processes mentioned above are used in a wide variety of fields which include not only bar cords as mentioned previously but also reproduction of books, documents and the like, electronic computers, facsimiles, ticket vending machines, labels, cards, etc. and, moreover, thsse recording materials are applicable to systems for preventing forgery and reproduction of high density-inputted information or such records of information as cannot be seen with the naked eye, or for unlocking apparatuses, laser disks and the like.

In these recording materials, the spirobenzanthracene phthalide compounds of the formula (I) may be used either singly or in admixture with several of them. In addition, the compounds of the formula (I) can also be used in combination with the following known chromogenic dyes which include, for example, black color formers such as 3-diethylamino-6-methyl-7-phenylaminofluoran, 3-N-methyl-N-cyclohexylamino-6-methyl-7-phenylaminofluoran, 3-N-methyl-n-propylamino-6-methyl-7-phenylaminofluoran, 3-N-isopentylethylamino- 6-methyl-7-phenylaminofluoran, 3-diethylamino-7-m-trifluoromethylphenylaminofluoran, 3-di-n-butylamino-7-chlorophenylaminofluoran and 3-N-ethyltoluidino-6-methyl-7-phenylaminofluoran; buue color formers such as crystal violet lactone, benzoyl leucomethylene blue and 5-(or 7)-(1-octyl-2-methylindol-3-yl)-5-(or 7)-(4-diethylamino-2-ethoxyphenyl)-5,7-dihydrofuro(3,4-b)pyridine-7(or 5)-one; green color formers such as 3-diethylamino-5-methyl-7-dibenzylaminofluoran and 3-N-isobutyl-ethylamino-7-phenylaminofluoran; and red color formers such as 3-diethylamino-6-methyl-7-chlorofluoran, 3-cyclohexylamino-6-chlorofluoran, 3-N-isobutyl-ethylamino-6- methyl-7-chlorofluoran, 3-N-isobutyl-ethylamino-7-chlorofluoran, 3-N-isobutyl-ethylmaino-7-chlorofluoran, 3-N-isobutyl-ethylamino-7-methylfluoran and 3-N-isobutyl-ethylamino-5,6-benzofluoran.

Further, the compounds of the formula (I) can also be used in combination with other kinds of chromogenic dyes which absorb, at the time of forming colors, electromagnetic waves ranging from the region of visible light to the region of near infrared rays. Such chromogenic dyes include, for example, phthalide, thiofluoran or fluorene type compounds as previously referred to in the Background of the Invention. Still further, the compounds of the formula (I) can also be used in combination with such compounds as disclosed in Japanese Patent Applns. Nos. 126149/1985, 215212/1985, 224955/1985 and 247135/1985 which were filed by the present applicant, or in Japanese Patent Appln. No. 229981/1985.

Furthermore, the compounds of the formula (I) can be used in combination with dyes or pigments which do not absorb electromagnetic waves in the region of near infrared rays. This combination use is effective for modifying coloration with a pale grayish yellow color which is liable to occur in color forming recording materials prepared by using the compounds of the formula (I).

The compounds of the formula (I) according to the present invention develop color which absorbs electromagnetic waves ranging from the region of visible light to the region of near infrared rays when used in color forming recording materials, e.g., pressure-sensitive copying papers, heat-sensitive recording papers and the like. Thus, the present compounds can be applied in an information reading apparatus using semiconductor laser, which exhibits an effect to enlarge the field of application of color forming recording materials.

EXAMPLE 1

(Preparative Example)

A flask was charged with 23.5 g of 3-(4'-dimethylaminophenyl)-3-(4"'-dimethylaminonaphthyl)-6-dimethylaminophthalide, 53.2 g of anhydrous aluminum chloride and 200 ml of 1,1,2,2-tetrachloroethane. The mixture was gradually heated with stirring, and the reaction was continued at a temperature of 115°–130° C. for 1 hour, followed by pouring the reaction mixture into iced water. After distilling off the solvent by steam distillation, the deposit was collected by filtration, dissolved in toluene and washed with a 20% aqueous solution of caustic soda, and then with water. The toluene layer was then concentrated and cooled. The crystals precipitated were collected by filtration and recrystallized from toluene to obtain 12.0 g of 6,4',10'-tris(dimethylamino)-spiro[7H-benz[de]anthracene-3,7'-phthalide]of the following formula as pale yellow crystals, decomposition point 190°–200° C. Infrared spectrum of the crystals thus obtained was shown in FIG. 1.

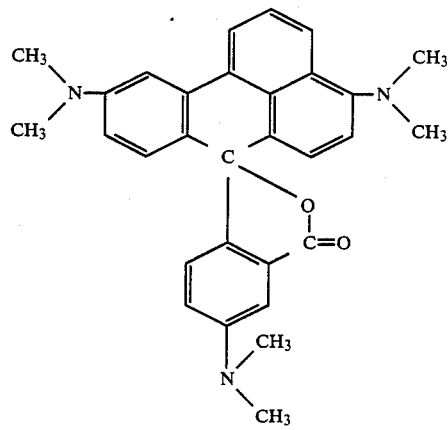

EXAMPLE 2

Figure 2:
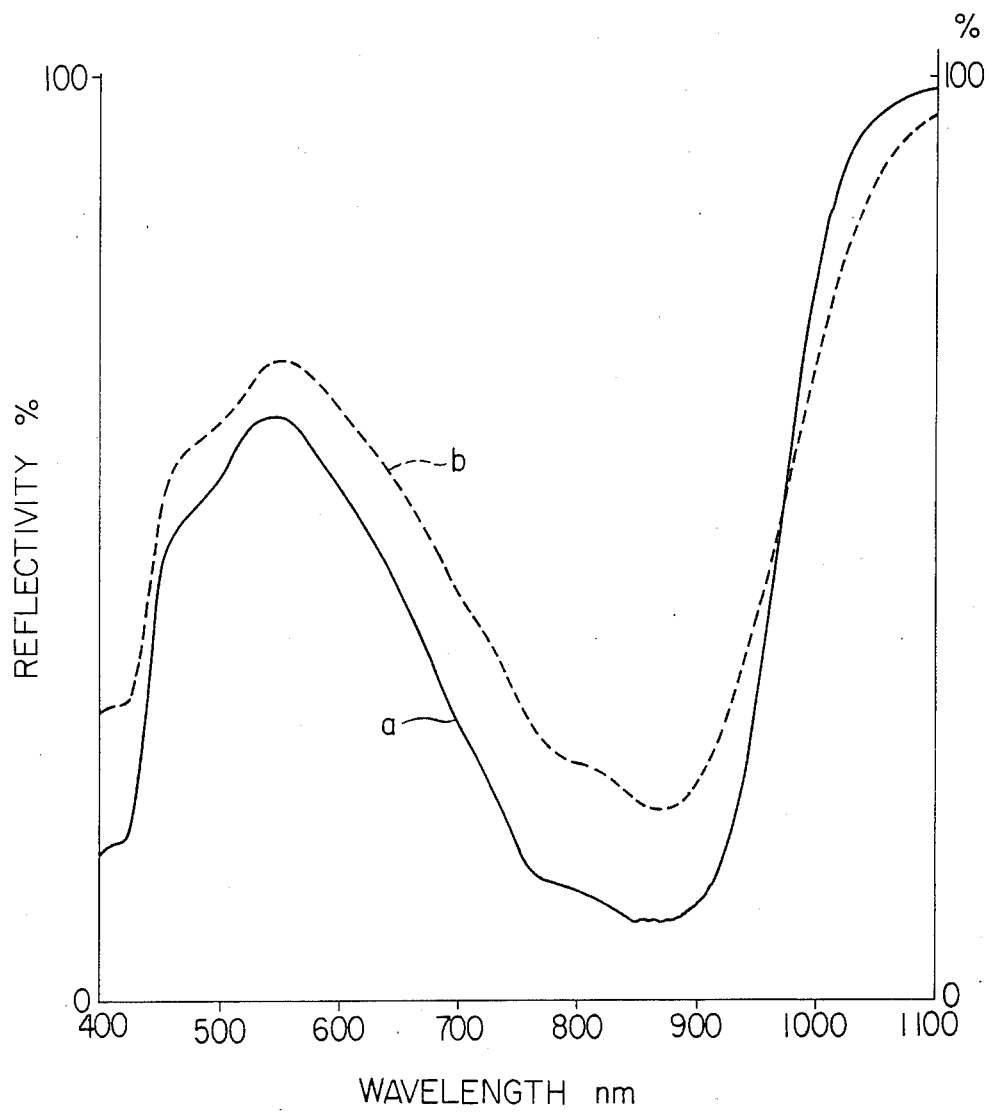
FIG. 2 shows two kinds of reflection curves obtained in Example 2, where curve a is a reflection curve of the color formed by clay (activated clay) and curve b is a reflection curve of the color formed by a phenol resin.

The spirobenzanthracene phthalide compound prepared in Example 1 was dissolved in toluene, and the solution was dropped onto a clay-coated bottom sheet and a resin-coated bottom sheet for use in pressure-sensitive copying paper, whereupon each bottom sheet developed a pale grayish green color. A reflection curve of the developed surface of each bottom sheet was depicted with a spectrophotometer-integrating sphere. The results are shown in FIG. 2.

EXAMPLE 3

(Pressure-sensitive copying paper)

One gram of 6,4',10'-tris(dimethylamino)-spiro[7H-benz[de]anthracene-3,7'-phthalide]was dissolved in 20 g of alkylnaphthalene while heating at 90° C. (Solution A). Separately, 2.0 g of gelatin (isoelectric point 8.0) and 0.5 g of carboxymethyl cellulose were dissolved perfectly in 120 ml of water (Solution B). Subsequently, Solutions A and B were mixed at 50°–60° C., stirred at high speed to emulsify and adjusted to pH 8.5–9.0. After the adjustment of pH, the emulsion was stirred for 20 minutes at high speed, adjusted pH with dilute acetic acid to reduce gradually to pH 3.8, cooled to 5°–10° C. with continued stirring, charged with 6 g of formalin (37%), and the stirring was continued at 10°–20° C. for additional 1 hour.

The emulsion was then adjusted to pH 9.0 with an aqueous sodium hydroxide solution (5%). This emulsion was gentley stirred for additional several hours to obtain an emulsion containing very fine capsule covered with gel films of carboxymethyl cellulose and gelatin, each capsule containing inside an alkyl naphthalene solution of 6,4',10'-tris(dimethylamino)-spiro-[7H-benz[de]anthracene3,7'-phthalide]. This emulsion was coated on a paper and dried to prepare a top sheet of pressure-sensitive copying paper. Separately, a phenol-formalin resin was coated on a paper and dried to prepare a bottom sheet. The coated surface of the top sheet was placed on the coated surface of the bottom sheet and a pressure was applied locally to the uncoated surface of the top sheet, whereby the pressureapplied portions of the surface of the bottom sheet developed a slightly grayish green color. A reflection curve of this color developed portions had substantially the same shape as that obtained in Example 1.

EXAMPLE 4

One gram of 6,4′,10′-tris(dimethylamino-spiro[7H-benz[de]anthracene-3,7′-phthalide]was mixed with 9.0 g of 3-N-methyl-N-cyclohexylamino-6-methyl-7-phenylaminofluoran (black color forming dye). 3.5 g of this mixture, 41.5 g of a 15% aqueous solution of polyvinyl alcohol (KURARAY-105, produced by Kuraray Co., Ltd.), 15.0 g of clay (UW-90, produced by Engelhard) and 40.0 g of water were charged, together with 150 g of glass beads (1–1.5 mm in diameter), into a 250 ml polyethylene bottle, the bottle was sealed and mounted on a paint conditioner manufactured by Red Devil Co. The bottle was shaken at a rate of 630 times/min for 5 hours, and thereafter the glass beads were removed to obtain an aqueous suspension of the above mixture (Suspension A-1).

Separately, 10.5 g of bisphenol A as a color developer, 41.5 g of a 15% aqueous solution of polyvinyl alcohol (same as above), 8.0 g of clay (same as above) and 40.0 g of water were charged, together with 150 g of glass beads, into a 250 ml polyethylene bottle, and the bottle was sealed. The bottle was shaken with the paint conditioner at a rate of 630 times/min for 8 hours, and the glass beads were then removed to obtain an aqueous suspension of bisphenol A (Suspension B).

The suspensions A-1 and B, each 10 g, were mixed together, and the mixture was stirred for 20 minutes to obtain a coating liquid.

This coating liquid was coated with wire rod No. 12 onto a white paper and dried for 2 minutes with hot air at 60° C. to prepare a heat-sensitive recording paper I. The coated surface of the heat-sensitive recording paper became slightly grayish yellow color.

The coated surface of this heat-sensitive recording paper was heated with a heat gradient tester (manufactured by Toyo Seiki Seisakusho K.K.) at a temperature of 150° C. for 5 seconds. The heated portion of this coated surface developed a black color.

A reflection curve of this color developed portion was depicted with a spectrophotometer-integrating sphere. The results are shown in FIG. 3.

Figure 3:
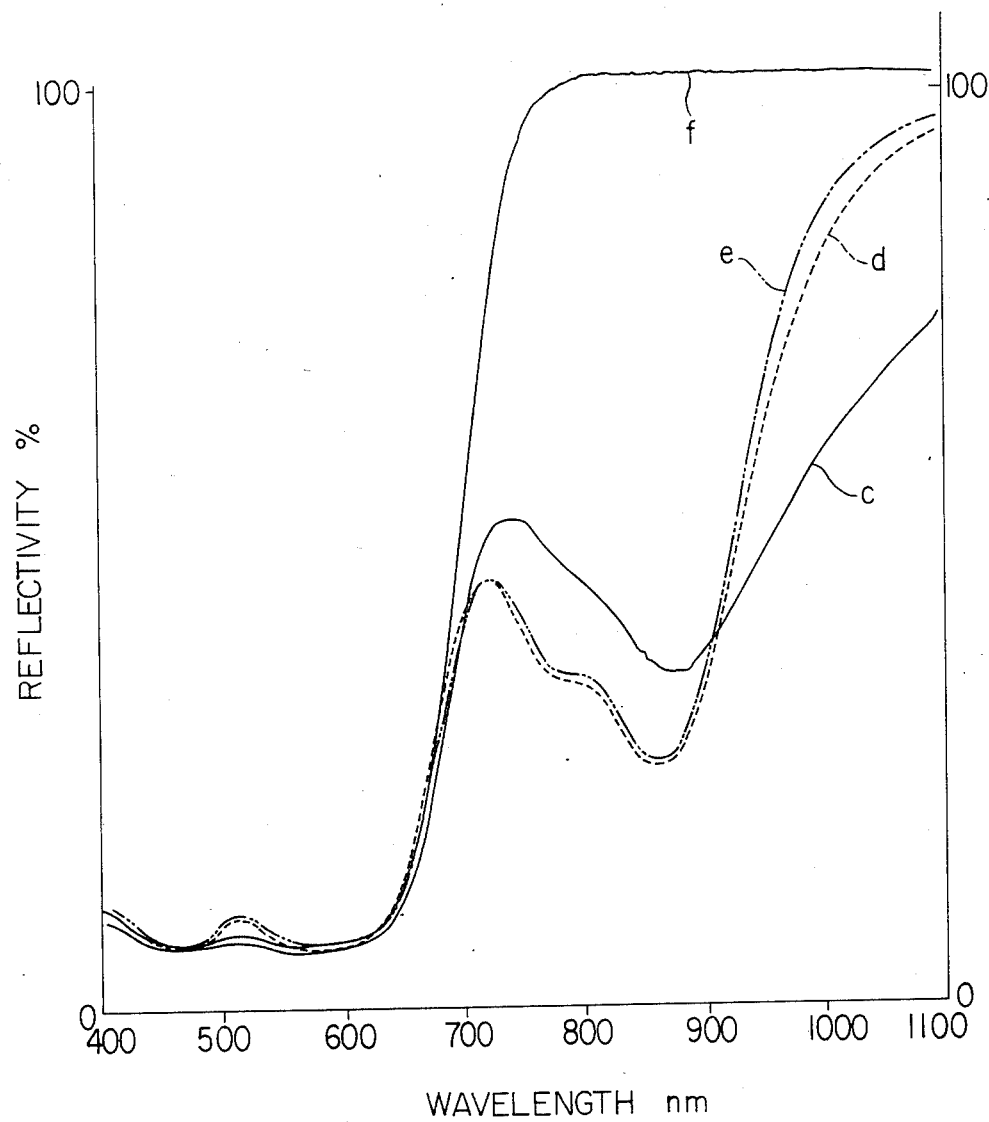
FIG. 3 shows four kinds of reflection curves of the colors formed on the heat-sensitive recording papers prepared in Example 4, where curves c, d, e and f are reflection curves of the colors formed on the heat-sensitive recording papers I, II, III and VI, respectively.

In FIG. 3, there were also shown reflection curves of the color developed surfaces obtained by heating in the same manner as above the coated surfaces of heatsensitive recording papers II and III, respectively prepared likewise but using 4-hydroxy-4′-isopropoxydiphenyl sulfone and benzyl p-hydroxybenzoate in place of the above-mentioned color developer bisphenol A, and a reflection curve of the color developed surface obtained by heating in the same manner as above the coated surface of a heat-sensitive recording paper IV (using bisphenol A as a color developer) prepared likewise but using 3.5 g of 3-N-methyl-N-cyclo-hexylamino-6-methyl-7-phenylaminofluoran in place of 3.5 g of the above-mentioned mixture.

The amount of the present spiroanthracene compound used in this example was 1/9 of that of the fluoran compound used in combination therewith. Nevertheless, it can be seen from FIG. 3 that percent absorption in the vicinity of 860 nm of curves c, d and e, respectively, is about 70% or more of percent absorption of curve f in the visible light region, i.e. 400–600 nm.

EXAMPLE 5

Figure 4:
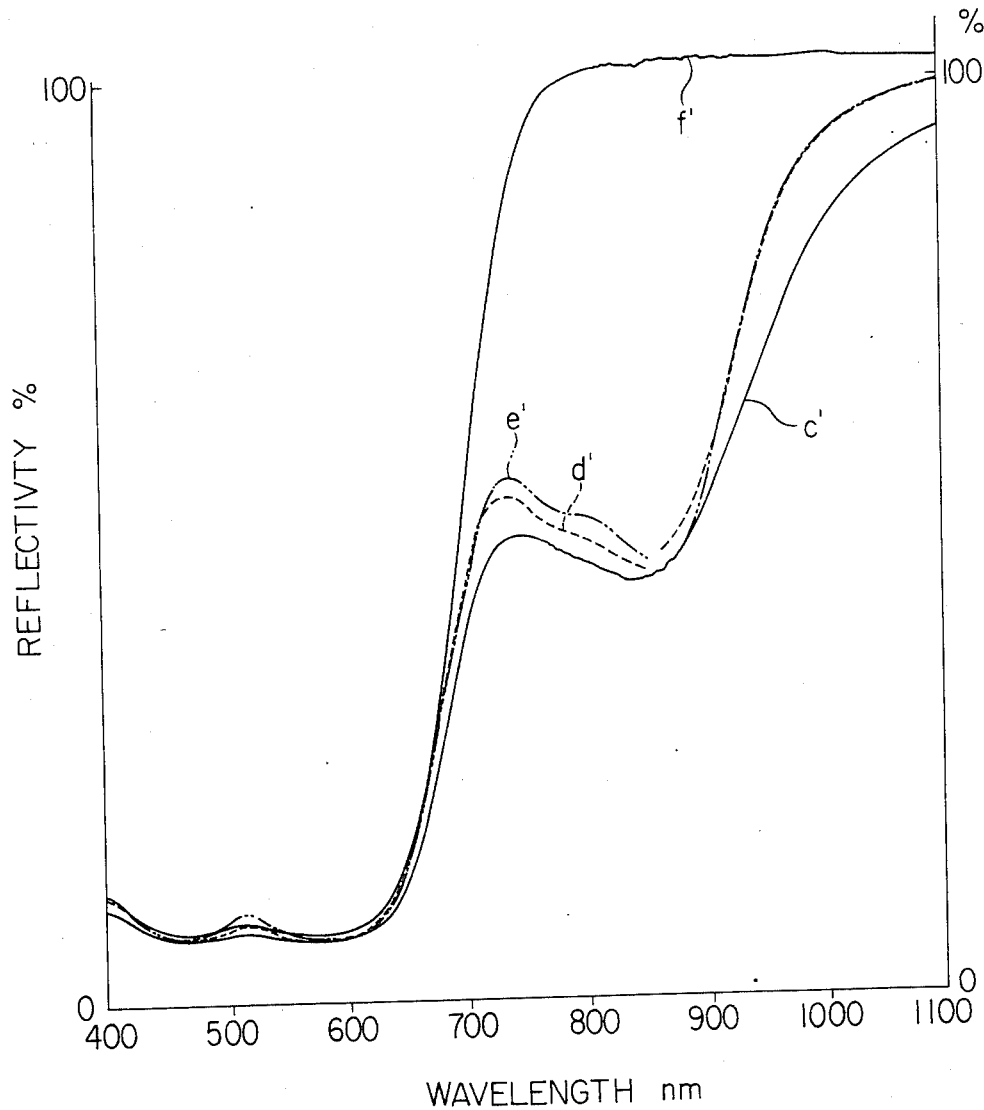
FIG. 4 shows four kinds of reflection curves of the colors formed on the heat-sensitive recording papers prepared in Example 5, where curves c', d', e', and f' are reflection curves of the colors formed respectively on the heat-sensitive recording papers I, II, III and IV which were subjected to the light fastness test conducted therein.

The color developed surfaces of the heat-sensitive recording papers I, II, III and IV described in Example 4 were irradiated with light using a light fastness tester (carbon arc type). The reflection curves were depicted in the same manner as in Example 4. The results are shown in FIG. 4. Comparing FIG. 4 with FIG. 3, it is understood that the color obtained from the present compound still possesses its absorption in the region of near infrared rays in the vicinity of 850 nm even after a 5-hour irradiation with light from carbon arc.

EXAMPLE 6

Following substantially the same procedure as described in Example 4 but using 7 g of 6,4′,10′-tris(dimethylamino)-spiro-[7H-benz[de]anthracene-3,7′-phthalide], 41.5 g of a 15% aqueous solution of polyvinyl alcohol, 11.5 g of clay and 40.0 g of water, a suspension of a color former was prepared (Suspension A-2).

Separately, a suspension of tribromomethylphenyl sulfone was prepared by using 3.5 g of tribromomethylphenyl sulfone, 41.5 g of a 15% aqueous solution of polyvinyl alcohol, 15.0 g of clay and 40.0 g of water (Suspension B-2).

The suspension A-2 was mixed with the suspension B-2 in the weight ratio of 1:2, and the mixture was coated onto a paper and dried with hot air at 60° C. to prepare a heat-sensitive recording paper.

The coated surface of this heat-sensitive recording paper was heated with the heat gradient tester at a temperature of 200° C. for 5 seconds, thereby developing a color. The color hue was green. A reflection curve of the color developed portion of the coated surface was shown in FIG. 5 (Curve a).

EXAMPLE 7

A suspension of tetracyanoquinodimethane was prepared by using 10.5 g of tetracyanoquinodimethane, 41.5 g of a 15% aqueous solution of polyvinyl alcohol, 8.0 g of clay and 40.0 g of water (Suspension B-3).

The suspension A-2 prepared in Example 6 was mixed with this suspension B-3 in the weight ratio of 1:2, the mixture was coated onto a paper was dried with hot air at 60° C. to prepare a heat-sensitive recording paper. The coated surface of the paper was a yellow color.

This heat-sensitive recording paper was heated and color developed in the same manner as in Example 6. The hue of the developed color was green. A reflection curve of the color developed portion was shown in FIG. 5 (Curve b).

EXAMPLE 8

Example 7 was repeated except that zinc p-nitro-benzoate was used in place of the tetracyanoqinodimethane.

Figure 5:
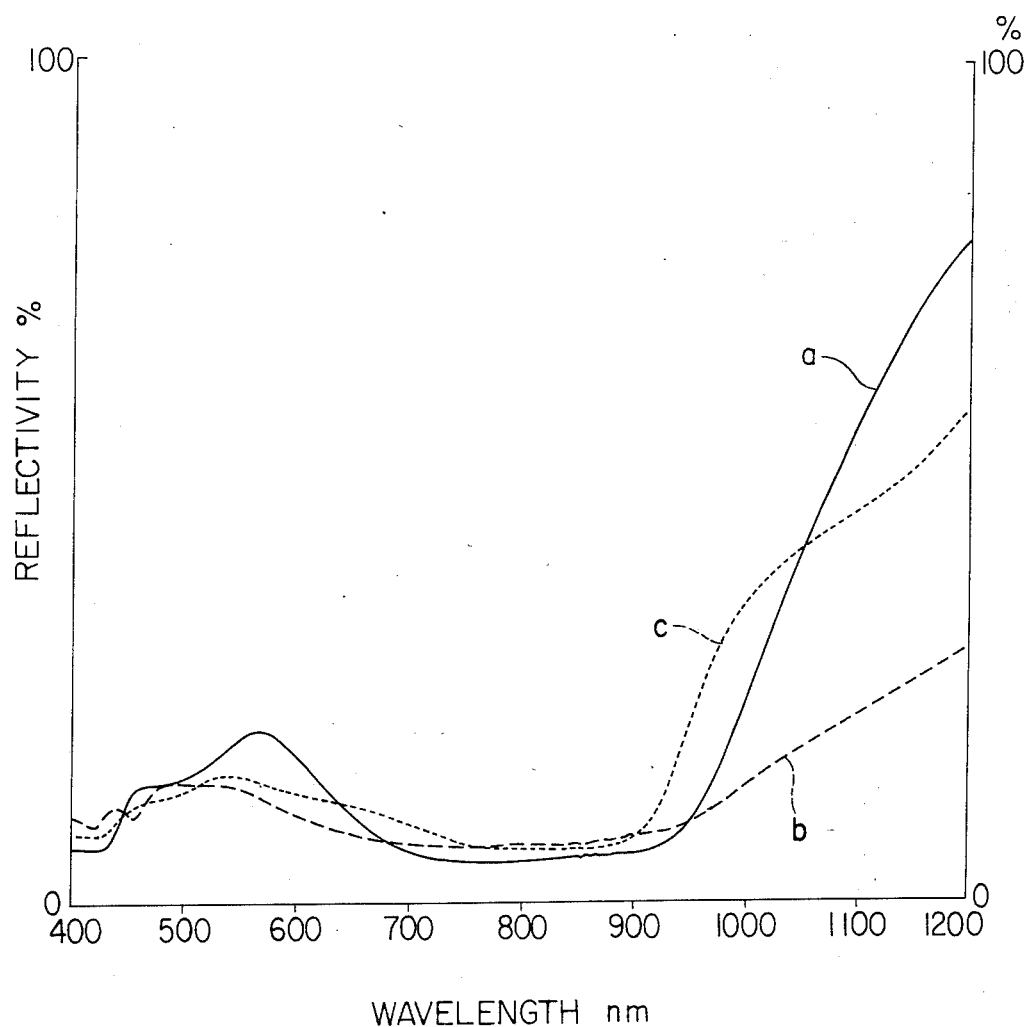
FIG. 5 shows reflection curves of the colors formed on the heat-sensitive recording papers prepared in Examples 6, 7 and 8, where curves a, b and c are reflection curves for Examples 6, 7 and 8, respectively.

A reflection curve of the color developed portion of the heat-sensitive recording paper was shown in FIG. 5 (Curve c).

What is claimed is:

1. A spirobenzanthracene phthalide compound of the formula (I)

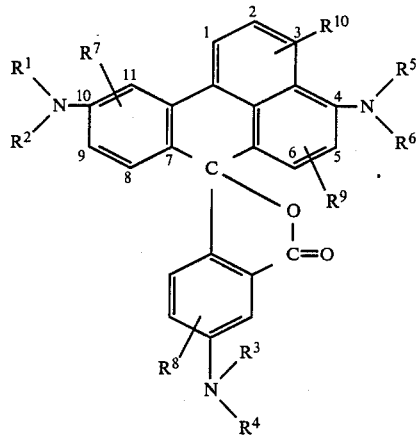 (I)

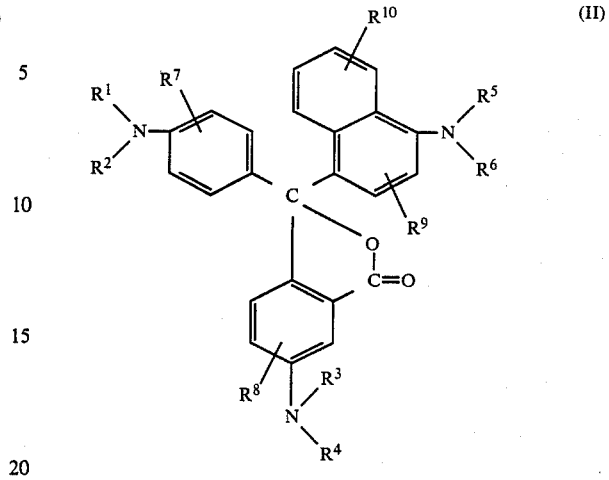 (II)

wherein $R^1$, $R^2$, $R^3$, $R^4$, $R^5$, and $R^6$ independently represent $C_1$-$C_8$ alkyl, or $C_1$-$C_8$ alkyl substituted by $C_1$-$C_5$ alkoxy; $C_5$ of $C_6$ cycloalkyl; unsubstituted aralkyl or aryl, or aralkyl or aryl substituted by $C_1$-$C_5$ alkyl or $C_1$-$C_5$ alkoxy, and $R^1$ and $R^2$, $R^3$, and $R^4$, and $R^5$ and $R^6$, taken together with the nitrogen atom to which they are attached, form a pyrrolidino, piperidino or morpholino ring, and $R^7$, $R^8$, $R^9$ and $R^{10}$ independently represent hydrogen, $C_1$-$C_5$ alkyl, $C_1$-$C_5$ alkoxy or trifluoromethyl.

2. The compound of claim 1 wherein $R^1$ to $R^6$ are $C_1$-$C_4$ alkyl and $R^7$ to $R^{10}$ are hydrogen.

3. The compound of claim 1 wherein $R^1$ to $R^6$ are $C_1$-$C_5$ alkyl, $R^7$ is $C_1$-$C_5$ alkyl or trifluoromethyl, and $R^8$ to $R^{10}$ are hydrogen.

4. The compound of claim 1 wherein $R^1$, $R^3$ and $R^5$ are $C_1$-$C_5$ alkyl, $R^2$, $R^4$ and $R^6$ are $C_1$-$C_8$ alkyl, $C_1$-$C_5$ alkoxy-substituted $C_1$-$C_5$ alkyl, $C_6$ cyclohexyl, phenyl, or $C_1$-$C_5$ alkyl-substituted phenyl, and $R^7$ to $R^{10}$ are hydrogen.

5. The compound of claim 1 wherein $R^1$ and $R^2$ are benzyl, $R^4$ is phenyl, $R^3$, $R^5$ and $R^6$ are $C_1$-$C_5$ alkyl, and $R^7$ to $R^{10}$ are hydrogen.

6. The compound of claim 1 wherein $R^1$ and $R^2$ taken together with the nitrogen atom to which they are attached form pyrrolidino or morpholino ring, $R^3$ and $R^4$ are $C_1$-$C_5$ alkyl or benzyl, $R^5$ and $R^6$ are $C_1$-$C_5$ alkyl, and $R^7$ to $R^{10}$ are hydrogen.

7. The compound of claim 1 wherein $R^3$ and $R^4$ taken together with the nitrogen atom to which they are attached form pyrrolidino, $R^2$ is $C_1$-$C_5$ alkyl-substituted phenyl, $R^1$, $R^5$ and $R^6$ are $C_1$-$C_5$ alkyl and $R^7$ to $R^{10}$ are hydrogen.

8. A process of preparing the compound of claim 1 which comprises subjecting a compound of the formula (II)

wherein $R^1$, $R^2$, $R^3$, $R^4$, $R^5$, $R^6$, $R^7$, $R^8$, $R^9$ and $R^{10}$ are defined as defined in the frrmula (I), to dehydrogenation ring closure by the action of Friedel-Crafts type catalysts.

9. A color forming recording material which comprises a compound of claim 1 as a color former, and a developer.

10. The recording material of claim 9 wherein the developer is an acidic substance.

11. The recording material of claim 9 wherein the developer is an organohalogen compound which forms a halogen radical under the influence of light or heat.

12. The recording material of claim 9 wherein the developer is a quinoid type electron accepting substance.

13. The recording material of claim 10 wherein the acidic substance is selected from inorganic acidic substances, zinc salts of aromatic carboxylic acids, phenol resin type developers and phenolic acidic substances.

14. The recording material of claim 11 wherein the organohalogen compound is selected from tribromomethylphenyl sulfone.

15. The recording material of claim 12 wherein the quinoid type electron accepting substance is selected from chloranil, and tetracyanoquinodimethane.

16. The recording material of claim 9 which further comprises at least one color former selected from known black, blue, green and red color formers.

17. The recording material of claim 9 which further comprises at least one color former which forms color absorbing electromagnetic waves in the near-infrared ray regions by the action of developers.

18. The recording material of claim 9 which is selected from pressure-sensitive copying papers, heatsensitive recording papers, photosensitive recording papers, electron rays recording papers, electro thermorecording papers and discharge recording papers.

19. The recording material of claim 9 wherein the color former is a compound selected from group consisting of a compound of formula (I)

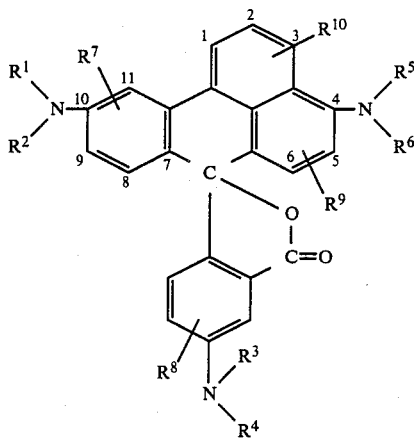

(I)

wherein
(a) $R^1$ to $R^6$ are $C_1$–$C_4$ alkyl and $R^7$ to $R^{10}$ are hydrogen;
(b) $R^1$ to $R^6$ are $C_1$–$C_5$ alkyl, $R^7$ is $C_1$–$C_5$ alkyl or trifluoromethyl, and $R^8$ to $R^{10}$ are hydrogen;
(c) $R^1$, $R^3$ and $R^5$ are $C_1$–$C_5$ alkyl $R^2$, $R^4$ and $R^6$ are $C_1$–$C_8$ alkyl, $C_1$–$C_5$ alkoxy-substituted $C_1$–$C_5$ alkyl, $C^6$ cyclohexyl, phenyl, or $C_1$–$C_5$ alkyl-substituted phenyl, and $R^7$ to $R^{10}$ are hydrogen;
(d) $R^1$ and $R^2$ are benzyl, $R^4$ is phenyl, $R^3$, $R^5$ and $R^6$ are $C_1$–$C_5$ alkyl, and $R^7$ to $R^{10}$ are hydrogen;
(e) $R^1$ and $R^2$ taken together with the nitrogen atom to which they are attached form pyrrolidino or morpholino ring, $R^3$ and $R^4$ are $C_1$–$C_5$ alkyl or benzyl, $R^5$ and $R^6$ are $C_1$–$C_5$ alkyl or benzyl, $R^5$ and $R^6$ are $C_1$–$C_5$ alkyl and $R^7$ to $R^{10}$ are hydrogen; and
(f) $R^3$ and $R^4$ taken together with the nitrogen atom to which they are attached form pyrrolindino, $R^2$ is $C_1$–$C_5$ alkyl-substituted phenyl, $R^1$, $R^5$ and $R^6$ are $C_1$–$C_5$ alkyl and $R^7$ to $R^{10}$ are hydrogen.

* * * * *